United States Patent [19]

Rumball

[11] 4,108,587

[45] Aug. 22, 1978

[54] PRODUCTION OF COMPOSITE CONTAINERS

[75] Inventor: Kenneth Francis Rumball, Great Bookham, England

[73] Assignee: Airfix Industries Limited, London, England

[21] Appl. No.: 786,573

[22] Filed: Apr. 11, 1977

[30] Foreign Application Priority Data

Apr. 9, 1976 [GB] United Kingdom ............... 14691/76

[51] Int. Cl.² .......................... B29D 3/00; B29F 1/00; B29C 6/00
[52] U.S. Cl. .................................. 425/112; 425/129 R
[58] Field of Search .................... 425/112, 117, 129 R

[56] References Cited

U.S. PATENT DOCUMENTS

| | | | |
|---|---|---|---|
| 3,154,617 | 10/1964 | Schenk et al. | 425/112 X |
| 3,159,701 | 12/1964 | Herter | 425/129 X |
| 3,476,852 | 11/1969 | Shattuck | 425/129 X |
| 3,511,902 | 5/1970 | Santangelo | 425/112 X |
| 3,543,338 | 12/1970 | Cooper | 425/129 R X |
| 3,780,559 | 12/1973 | Turner | 425/129 X |
| 3,930,770 | 1/1976 | Gaudet et al. | 425/129 R X |
| 3,931,385 | 1/1976 | Sutch | 425/129 R X |

*Primary Examiner*—J. Howard Flint, Jr.
*Attorney, Agent, or Firm*—Scrivener, Parker, Scrivener & Clarke

[57] ABSTRACT

An injection moulding machine to make a container from a blank which has an end panel and side panels hinged to the end panel, the machine includes guide means which position edges of the side panels as they are folded relative to the end panel and positioned around the core tool during closing movement of the tools.

13 Claims, 16 Drawing Figures

U.S. Patent  Aug. 22, 1978  Sheet 1 of 11  4,108,587
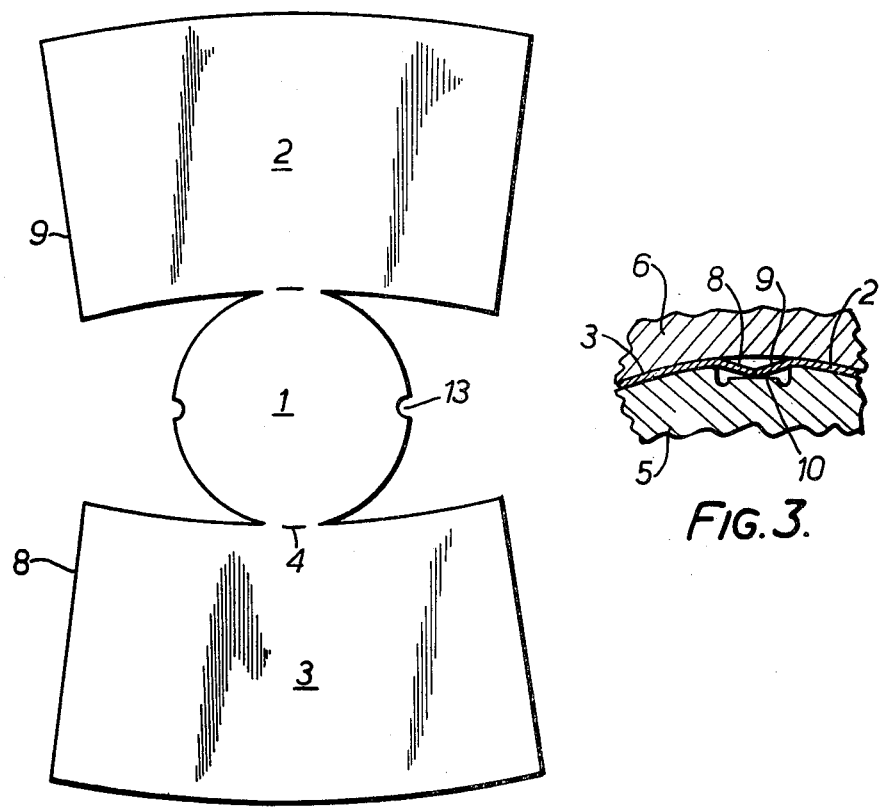
FIG.1.
FIG.3.
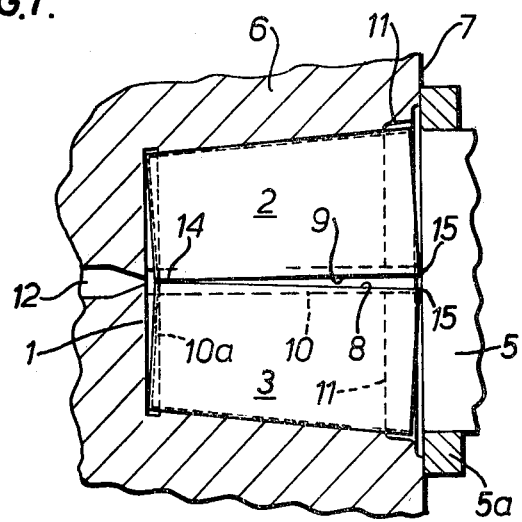
FIG.2.

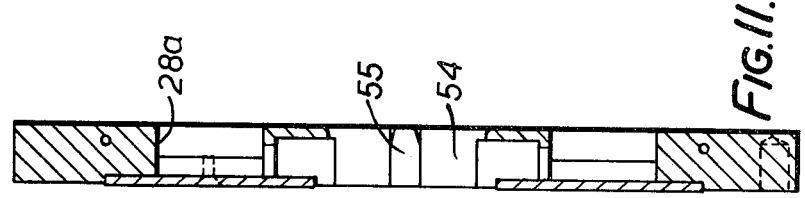
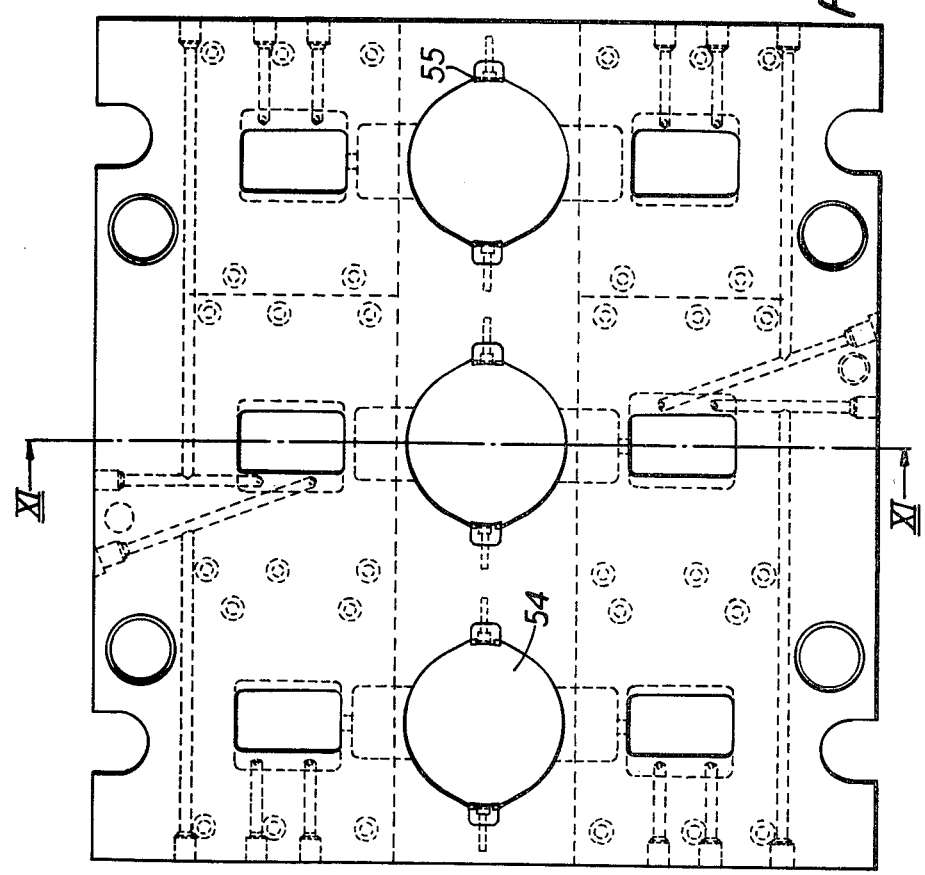

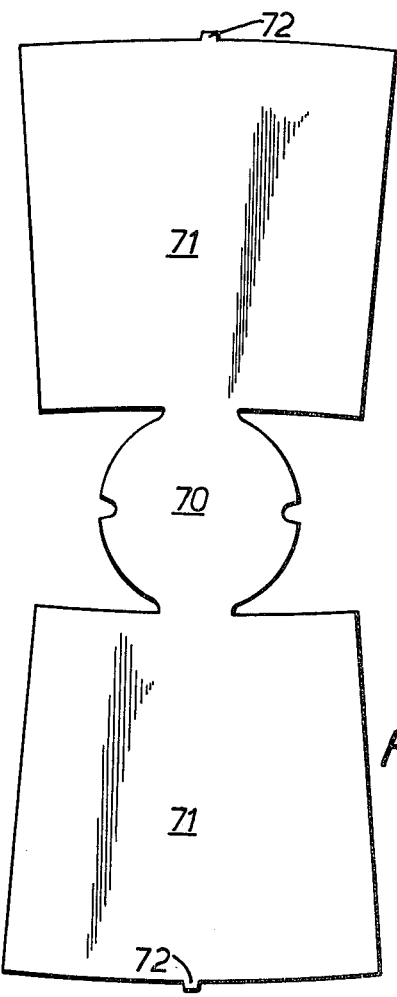
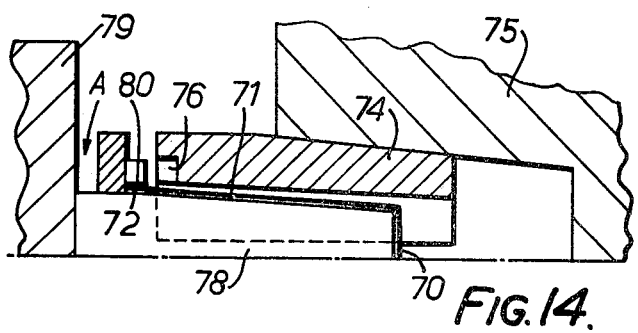
Fig. 13.
Fig. 14.

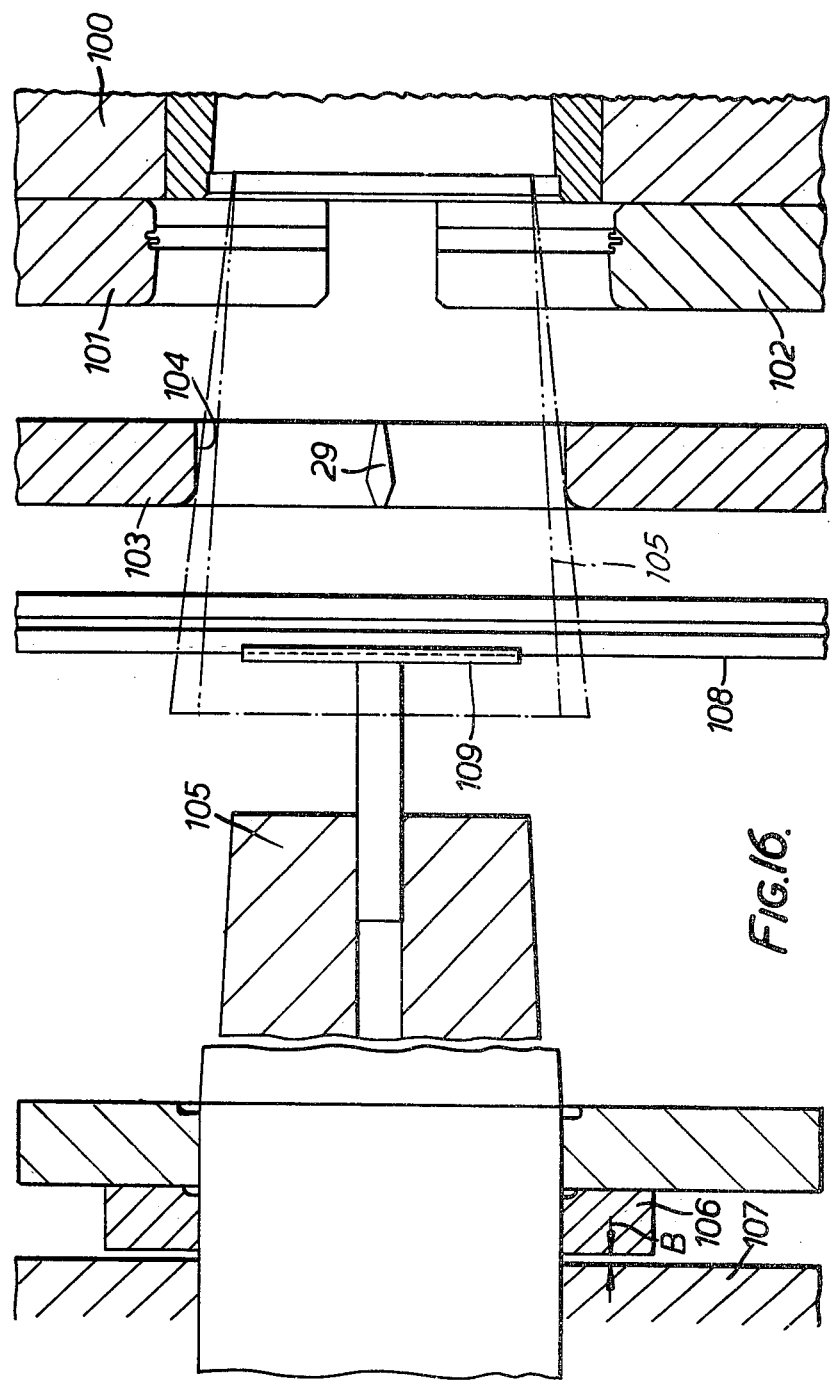

PRODUCTION OF COMPOSITE CONTAINERS

This invention is concerned with improvements in and relating to the production of composite containers, that is containers made up of a blank of, for example, board, paper, plastics or metal foil which is folded or shaped to the shape of the article to be formed, and, while constrained to that shape in a mould cavity, is at least seamed by injection moulding.

A particularly favoured shape of container at present is as near cylindrical as practicable. In effect the shape is frusto-conical with a very small cone angle. To make such a container a blank is cut to define a base panel and side panels, usually two. This blank is trapped between a core tool and a cavity tool and while so trapped material is injected to seam the side panels and base panel and the juxtaposed edges of adjacent side panels.

Reference will now be made to FIGS. 1 to 3 of the accompanying drawings of which:

FIG. 1 is a plan view of a blank;

FIG. 2 is a partially sectioned core tool and stripper ring in a sectioned cavity with a blank trapped therebetween, and FIG. 3 is a detail section of the tools and blank of FIG. 2 at a seam channel.

Figure 4:
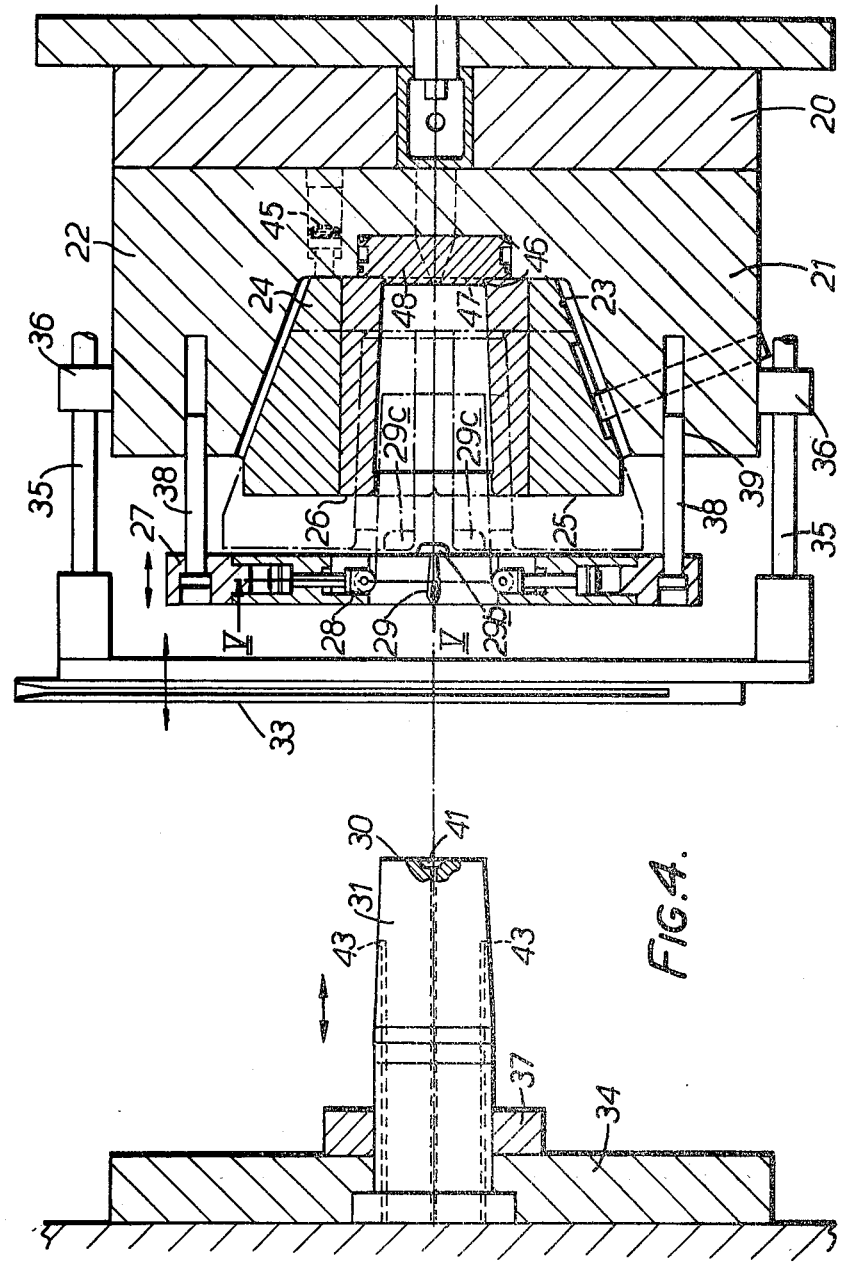

The blank which may be a laminate to give particularly desired characteristics to the inside and outside of the container, has a base panel 1 and integral with it side panels 2, 3, foldable at perforations 4 relative to the base panel. To make up the container the blank is trapped between a core tool 5 and its stripper ring 5a and a cavity tool 6 which abut on the plane 7 to form a cavity corresponding to the wall and base of the container to be formed. This cavity is occupied by the blank of which the base panel 1 is trapped between the end face of the core tool and the base of the cavity tool and the side panels are wrapped around the core tool with juxtaposed edges overlying seam channels on the core tool. Two edges 8 and 9 can be seen, overlying a side panel seam channel 10. Unoccupied by the blank are a lip channel 11 in the cavity tool and the side panel seam channels 10 and a base panel seam channel 10a all in the core tool. Pin gates 12 are located in the base of the cavity tool, one opposite the end of each side panel seam channel 10, the base panel having cut outs 13 to allow communication between each pin gate and the base panel seam channel and the nearest side panel seam channel.

To position the blank between the tools, the tools are movable between an open condition in which they are spaced apart to allow a blank base panel to be located in front of the end of the core tool. When the tools close, usually by movement of the core tool toward and into the cavity tool, the core tool carries the base panel forward into the cavity tool, the side panels folding down on to the core tool as they pass into the cavity tool. In the case of a solid cavity tool it is presently preferred to provide a mushroom on the forward face of the core tool which projects forwardly of that face in the open condition of the tools. This mushroom carries the base panel to the base of the cavity tool before the core tool has completed its closing movement. When the mushroom reaches the base of the cavity tool, the core tool continues to close, the mushroom the while telescoping into the core tool. In the case of a split cavity tool, the splits accept the core tool which reaches its closed position axially of the splits before the splits complete their radial closing movement. This results, in the case of both types of cavity tool, in there being no shear stress on the blank resulting from relative axial closing movement of the tools while in close contact and frictional engagement with the surfaces of the blank.

One of the problems however with these procedures is the accurate positioning of the juxtaposed edges of the blank and the edges of the side panels at the lip region of the container.

If the side panels are not correctly positioned weaknesses will be built into the container which are not readily discernible. If the side panels are angularly displaced so that juxtaposed edges of adjacent side panels are out of parallel, those edges may abut. In FIG. 2 the two juxtaposed edges 8, 9 are not parallel, the condition being exaggerated for illustration purposes. They are shown abutting at 14. If this occurs, see FIG. 3, the abutting edges may be forced inwards into the side panel seam channel 10. At the region where inturning occurs the seam will have locally reduced thicknesses both radially by virtue of the inward displacement and as between the edges (where they abut the thickness of the seam as between the edges becomes zero). Similar conditions occur at the lip where in the case illustrated in FIG. 2, the lip will be axially very thin at 15. Additionally, if the juxtaposed edges are too widely spaced at the lip there is more likelihood of injected material reaching the outside of the blank and spoiling the container.

It is an object of this invention to provide improved apparatus for making composite containers and in particular composite containers having bases with curved peripheries, e.g. circular, oval or polygonal with curved apices.

According to this invention there is provided apparatus for making a composite container using a blank having an end panel and side panels hinged thereto, the apparatus comprising a core tool and a cavity tool movable relative to one another between an open condition and a closed condition in which they define a cavity corresponding to the walls and an end of the container, blank feed means to position a blank, in the open condition of the tools, with the end panel in the path of relative movement of the core tool and guide means engageable by the edge means on the side panels forming position limits for those edge means as the blank is formed about the core tool.

Figure 5:
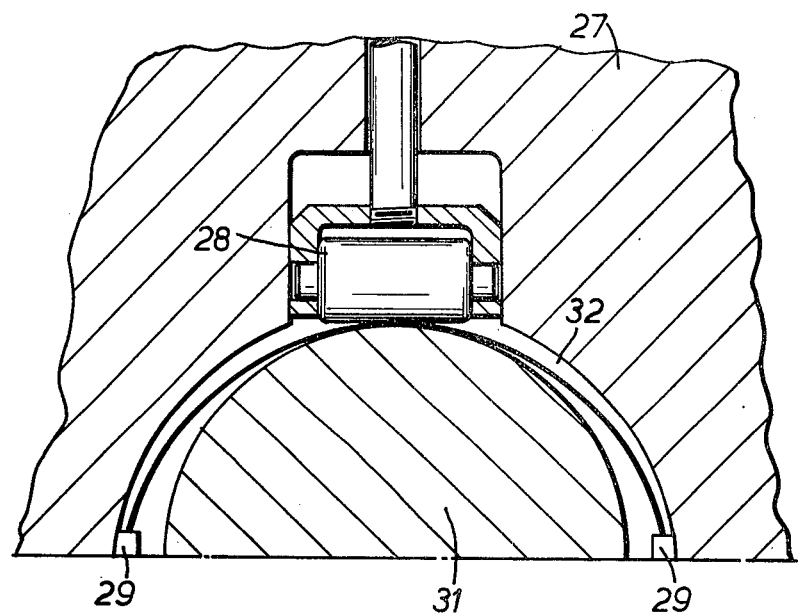
Figure 6:
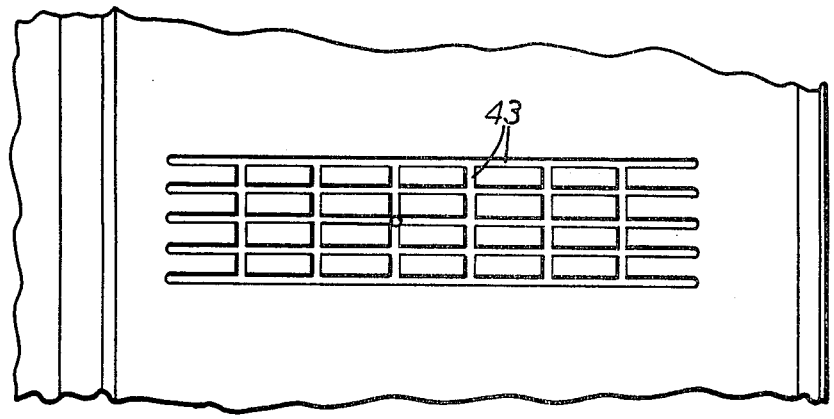
Figure 7:
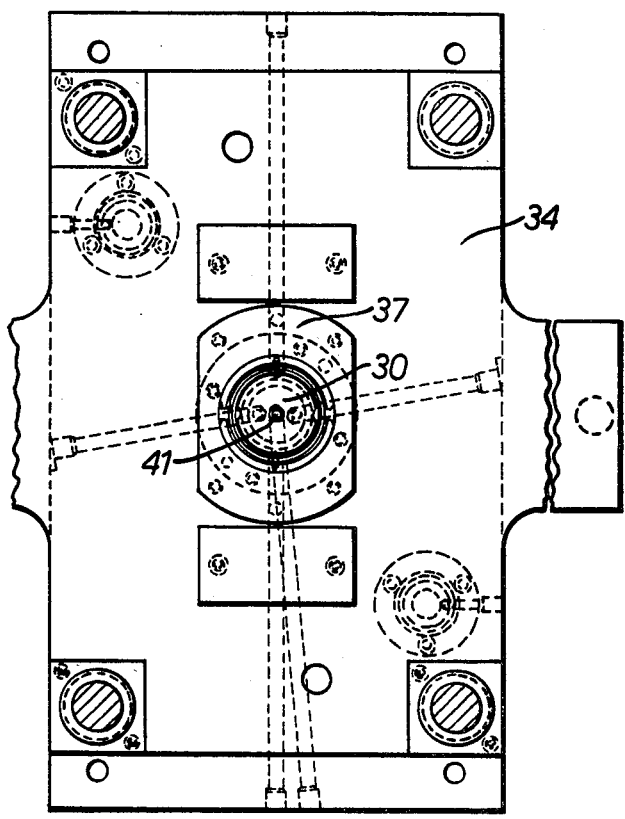
Figure 8:
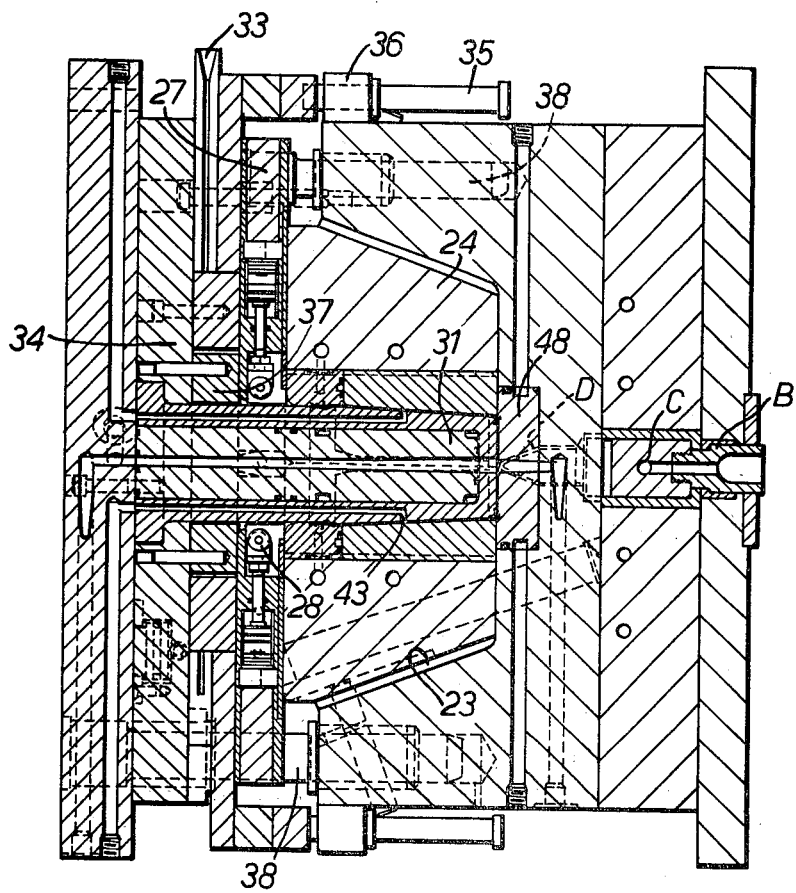
Figure 9:
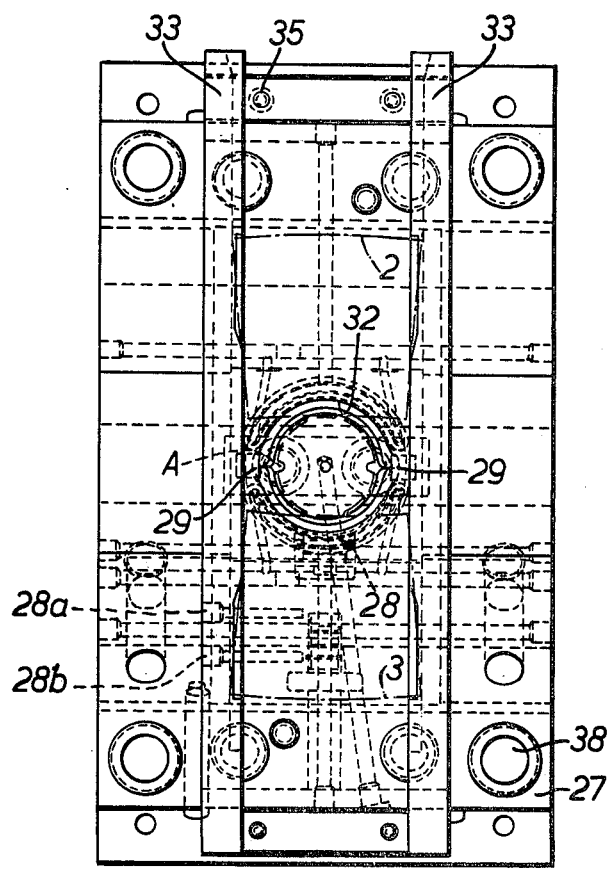
Figure 12:
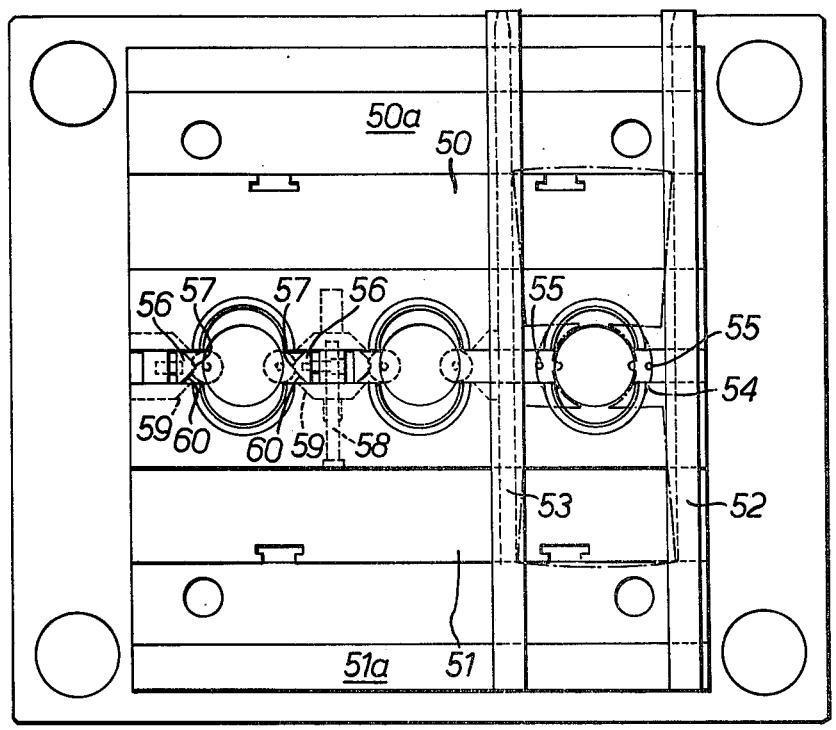
Figure 15:
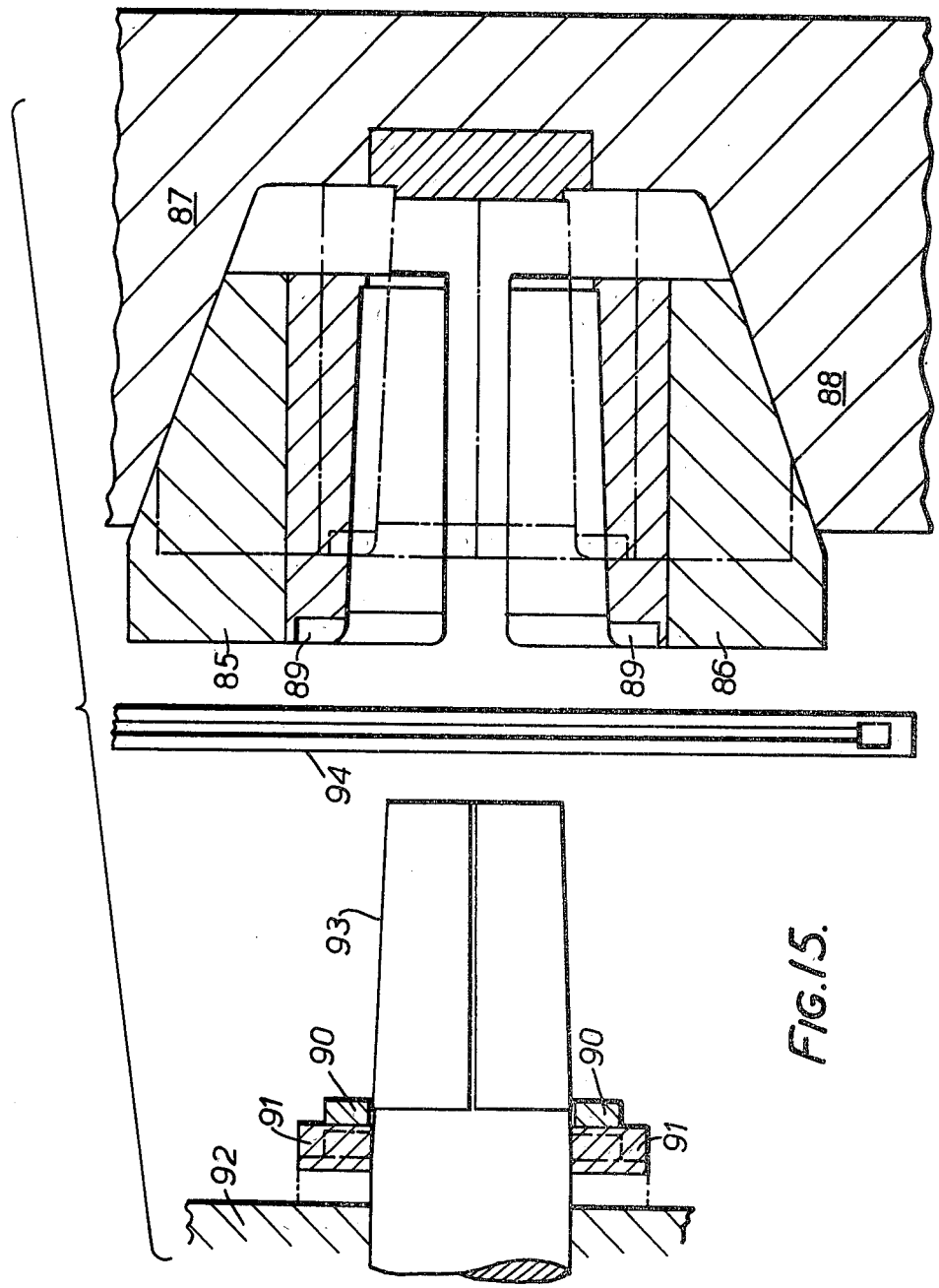

In order that the present invention may be well understood there will now be described some embodiments, given by way of examples only, reference being had to the following Figures of the accompanying drawings in which:

FIG. 4 is a diagrammatic cross section of a core tool and a split cavity tool;

FIG. 5 is a scrap section on the line V—V of FIG. 4;

FIG. 6 is a scrap plan view of a core tool;

FIG. 7 is a front elevation of a core, stripper plate and carrier plate;

FIG. 8 is a section of the core tool of FIG. 7 and a cavity tool closed and showing one of a pair of feed rails and a guide ring;

FIG. 9 is an elevation of the pair of feed rails, the guide ring and cavity tool of FIG. 7;

FIG. 10 is an elevation of a guide ring plate for a three impression split cavity tool;

FIG. 11 is a section on the line XI—XI of FIG. 10;

FIG. 12 is an elevation of feed rails and an alternative guide means for a three impression tool;

FIG. 13 is an elevation of a blank having guide edges on the trailing edges;

FIGS. 14 and 15 are sections through tools for handling blanks with guide edges and on the trailing edges;

FIG. 16 is a section through another embodiment of tools.

Referring to FIGS. 4 and 5, the apparatus includes a cavity tool comprising base block 20 carrying two main guide blocks 21, 22 which have converging guide surfaces 23, 24 on which run split cavity tool halves 25, 26 shown in chain dot line in the open condition and in full line in the closed condition.

Mounted on the guide blocks 21, 22 for movement relative thereto is a guide ring 27 in which are carried radially displaceable rollers 28 and a pair of diametrically opposed guide elements 29. The rollers are biased radially inwardly relative to tool axis X either pneumatically or by springs so that they are spaced apart approximately by a distance equal to the diameter of the forward end 30 of a core tool 31. The distance between the radially inwardly directed faces of the elements 29 is greater than the greatest external dimension of the finished product which will come from the cavity tool.

Aperture 32 of the guide ring 27 is preferably non-circular as can be seen in FIG. 5.

A pair of feed rails of which one is shown at 33 is positioned, in the open condition of the tools, between the forward end 30 of the core tool and the rear face of the guide ring 27, these rails serving to position a blank between the forward face of the core tool and the guide ring when the tools are in the open condition. As the core tool moves forward toward the closed condition it passes between the feed rails, there abutting the end panel of the blank, and thereafter initiating folding of the blank as the movement continues, the upper and lower edge regions of the blank being retarded by their continued engagement in the feed rails. Further forward movement results in plate 34 engaging the rails and displacing these which are carried by support rods such as 35 running in bushes 36 on the guide blocks.

Guide ring 27 is likewise displaceable by stripper ring 37 supported by plate 34, the ring being carried by guide rods 38 received in bushes 39 in the guide blocks.

In operation, with the tools in the open position shown in FIG. 4, a blank is fed along feed rails 33 to position a base panel opposite end 30 of the core tool. The forward end 30 of the core tool has a port 41 coupled to a vacuum source to thereby achieve a positive positioning of the base panel relative to the forward end and that positioning should be accurate by virtue of the positioning of the blank by the feed rails. The core tool in its continuing movement toward the closed condition, enters the aperture of guide ring 27 and the side panels are engaged by the rollers 28 and by the wall of the aperture. Folding of the side panels relative to the end panel continues and the side panels are progressively wrapped round the core tool. This brings the side edges of the side panels, that is the edges which will extend axially of the container, into contact with the elements 29, the side panels taking up the attitude shown in FIG. 5. The rollers press the side panels on to the core where positioning is assisted by pressure differential established at ports 43, of which there may be a number, coupled to the vacuum source. Thus the side panel edges are effectively located correctly circumferentially of the core tool by elements 29 and once so positioned are held fast by the pressure differential. A particular example of the configuration of the ports 43 is illustrated in FIG. 6.

As the core tool continues still to advance, the blank is carried to its axially final position relative to the split tool halves 25, 26. At this stage the carrier plate 34 has engaged the guide rails and the stripper plate 37 has engaged the guide ring and carried them forward and the guide ring has engaged the rear faces of the split halves. In driving them forward the guide ring causes the split halves to move radially inwardly relative to the tool axis and to trap the blank in the folded condition around the core tool. In the final axial position of the core tool and split halves they seal such parts of the molded cavity as are not occupied by the blank. Injection can now be effected and the seams and lip created. These are not shown as they have already been explained.

Upon completion of the injection cycle, the tools open assisted by springs, such as Belvue washers 45, and/or pistons and cylinders and/or coupling elements between the various movable components. The split halves are prevented from wedging with the core tool and the guide blocks by the Belleview washers. The completed article is able to pass through the aperture in the guide ring and will be ejected from the core tool, to which it adheres due to shrinkage of the moulding, by the stripper plate 37 which halts in the opening movement before completion of movement of the core tool relative thereto.

To assist in accurate positioning of the blank, the split halves may each be provided with an inwardly directed lip 46 at their inner ends which co-operate with a boss 47 on a base plug 48 together to define the bottom of the cavity tool. Thereby the edges of the side panels cannot be too far forward as the tools finally close radially. They could, however, possibly be too far back either due to bowing of the base panel or stretching of the hinges. To prevent this the guide ring may have diametrically opposed blocks 29b. As the tools close and the blank side panels are wrapped around the core tool they project radially outwardly from the core tool. The outwardly projecting parts at the end nearest the guide ring should, if correctly axially located, sweep past the leading faces of the blocks as the blank finally wraps around the core. If the blank is too far back, those parts will come into contact with the blocks which will act as cams on the trailing edges of the blank side panels and cause the blank side panels to be shifted axially down the core. The blocks are received by recesses 29c in the split halves when the tools close.

FIGS. 7, 8 and 9 illustrate tools such as shown in FIGS. 4 to 6 for making a container having outwardly projecting moulded parts at the lip. The same references have been used to indicate the same parts of the tools and coolant passages have been omitted for clarity. The cavity tool halves in this instance do not include a lip at the closed end of the container nor is there a plug at that end. Additionally, the blocks 29a and 29b are omitted here. In this instance the rollers of the guide ring are operated by double acting jacks, the fluid feed passages to which are shown at 28a and 28b. In these Figures is clearly seen the position of injection gate A at the foot of each container seam, a hot runner nozzle B into which the hot thermoplastic material is injected and from which it flows along gallery C to the individual nozzles D each feeding a gate.

Referring to FIGS. 10 and 11, there is shown a guide ring plate for a three impression split tool. The guide ring plate will again lie between the feed rails for each cavity and the cavities have an aperture 54 for each impression, each aperture including blank guide elements 55 like elements 29 described with reference to FIGS. 4 to 9. Recesses 28a are provided for mounting cylinders for guide rollers such as rollers 28 already described.

The feed rails in a three impression tool may comprise two outer rails and two inner rails, the inner rails each serving two adjacent cavities. Such an arrangement is shown in FIG. 12 where only two rails 52 and 53 are shown, the former an outer rail and the latter an inner rail.

Also shown in FIG. 12 is an alternative or an addition to the guide ring plate. In this case plungers 56 are carried on the split halves, though they could be mounted elsewhere. The plungers are set in guides such as 58 in the split halves which halves include inclined drive faces 59 with which faces 60 on the plungers cooperate. Suitable means such as springs or fluid urge the plungers of any one impression toward one another so that as the split halves separate the blades 57 move inward to operative positions while closure of the split halves drives them out, at which stage the side panel edges will have been correctly positioned.

So far, the guide arrangements have comprised elements associated with the tools against which elements axially extending edges to be seamed bear as the blank is inserted into the tool cavity.

Referring now to FIG. 13, a blank is shown comprising base panel 70 and side panels 71, the latter including positioning lugs 72 on the edges 73 of the side panels remote from the base panel 70. Referring to FIG. 14 a split cavity tool and core tool are shown. A cavity tool split half is shown at 74 running on a cavity base block 75 and having a recess 76 to receive a grooved stripper ring 77 of core tool 78. Stripper ring 77 is held forward on the core tool so as to be spaced from a core tool back plate 79 when the tools are open.

When the tools close a blank end panel positioned in the path of the core tool 78 is carried forward and the side panels fold down as they enter the splits. As the core tool approaches its final axial position relative to the splits, the lugs 72 enter grooves 80 of the stripper ring, those grooves being flared radially outwardly so that a lug entering a groove is progressively centred by the groove. The stripper ring is received by the recess 76 whilst the lugs still engage the grooves. Final axial movement of the core relative to the split halves and stripper ring, allowed for by spacing 'A' between the stripper ring and the back plate moves the blank lugs out of the grooves and thereafter the core tool and split halves more axially together to the final closed condition.

As an alternative or additionally to providing grooves in the stripper ring to centre the side panels, the stripper ring may have forwardly projecting teeth. Referring to FIG. 15, a split cavity tool is shown comprising split halves 85, 86 slidable on guide blocks 87, 88. Each split half has a radial recess 89 with which cooperates a tooth 90 on a stripper ring 91 which normally is biassed forward of a carrier plate 92 to the full line position shown in FIG. 15. In closing movement of a core tool 93, the blank base panel is driven forward of guide rails 94 by which the blank is delivered. As before the blank is progressively folded by relative movement of the core tool past the guide rails and then by the mouth of the split halves which are still in the open (full line) position. When the folding of the blank is reaching the final stage the teeth 90 engage the recesses in the blank. The core is now nearly fully home (chain-dot position in FIG. 15) axially relative to the split halves which have not yet started to close radially. The teeth 90 are entering in the recesses 89. Those teeth go fully home into the recesses before the core tool reaches its final axial position relative to the split halves. When the teeth are fully home they are still engaged in the recesses in the blank. A final travel of the core tool to its axially closed position relative to the split halves causes the core to move forward relative to the stripper ring thereby releasing the blank recesses from the teeth and bringing the core and split halves to the axially closed condition whereafter carrier plate 92 drives the split halves radially home relative to the core and the split halves and core axially home relative to the guide blocks.

Referring now to FIG. 16, the cavity tool here is part solid, part split. The tool includes a solid first cavity tool 100, a second cavity tool comprising split halves 101, 102, a guide plate 103 with blank forming aperture 104, a core tool 105, a stripper ring 106, a carrier plate 107 and blank guide rails 108. The core tool has a mushroom 109 normally biassed to extend forwardly of the core tool.

In this arrangement the core tool advances from the full line position, the mushroom engages the end panel of a blank supplied along guide rails 108 and carries the end panel forward, the mushroom end face preferably having ports coupled to a vacuum source. The blank shown in chain-dot line is folded down by the guide plate aperture toward the core tool (this being shown in chain-dot-dot line) described with reference to FIG. 4. The guide plate which has guide blades 29 as described with reference to FIG. 4 is driven forward by the stripper ring up to the split halves 101, 102. Thereupon the carrier plate, core and mushroom make a small further advance, taking up the spacing 'B' of stripper ring 106 from carrier plate 107, which brings the end panel on to the base of the cavity tool and the blank edges past the guide blades. Thereupon the core continues to advance resulting in telescoping of the mushroom into the core and causing the split halves to close radially by any suitable means such as by cam action.

Various modifications may be made to the various embodiments described. For example, referring to FIG. 4, there may with advantage be a small degree of movement between the core and the carrier plate. When the tools move toward the closed condition, the core carries the end panel of the blank to its final position axially of the cavity tool. At the final axial position the split tool is split, in the case of FIG. 4, axially. It may be split radially in the plane of the outer face of the base panel. Now if the fold between a side panel and the base panel or the free edges of the side panels or base panel are spoiled in any fashion or are not accurately positioned, then the core tool comes fully home and simultaneously the carrier plate drives the split halves fully home, a radial or an axial projection of the blank may jam between the tools and may cause damage. However if a degree of relative axial movement is provided between the core tool and the carrier plate, the splits will be closed by the carrier plate before the core carries the blank fully home. Thus the axial or radial split between the split halves and the base will close before the free edges of the base panel and side panels and the folds will be kept away from those splits as they close and thereby any trapping of the blank material at those splits will be avoided. The relative travel of the core and carrier plate which may be as little as 1 to 2 mm will thereby protect the tools against possible damage.

Such a small degree of relative movement cannot be conveniently illustrated but it will be understood readily from what has already been described.

I claim:

1. Apparatus for making a composite container from a planar blank of sheet material which includes an end panel and side panels each of which is foldable relative to the end panel from the planar condition to that position which it will occupy in forming the container, the apparatus comprising a core tool and a cavity tool which are movable relative to one another along a tool path between an open condition in which a blank in planar form can be positioned in a first location between the tools with the end panel intersecting said path and a closed condition in which the core tool is received by the cavity tool and in which the tools define a blank cavity in which they will clamp a blank between them with the panels folded to their relative final positions for forming the container and a mould cavity defining the shape of at least seam means for uniting edges of the blank juxtaposed by the folding of the panels, injection means to inject mouldable material into the mould cavity, blank guide means for positioning a blank in said first position and, blank positioning means relative to which the tools are movable during relative movement toward the closed condition and which define a blank edge guide engageable by a blank edge during the folding and insertion of the blank into the cavity tool, to set that edge at a predetermined position relative to the mould cavity and positioned outside the path of the finished container during ejection of the finished container from the apparatus.

2. Apparatus according to claim 1 which the blank is of flexible material and side panel shaping means are provided relative to which the tools are movable during relative movement to the closed condition, the core tool in moving relative to the shaping means drawing a side panel past those shaping means which urge that panel towards its final shape and toward a blank edge positioning means lying, in relation to the tool path, out of the path of the finished article when being removed from the apparatus.

3. Apparatus according to claim 2 in which the blank side panel shaping means include a guide surface directed toward the tool path.

4. Apparatus according to claim 3 in which the side panel shaping means and the blank positioning means are movable together parallel to the tool path upon relative movement of the tools towards the closed condition.

5. Apparatus according to claim 4 in which the blank side panel shaping means include rollers which are urged toward the path of the faces of the core tool against which side panels are to be positioned during relative closing movement of the tools so as to press such side panels against the core tool.

6. Apparatus according to claim 2 in which the blank guide means and the blank shaping and blank positioning means are displaceable parallel with the tool path by a core support plate respectively during relative closing movement of the tools.

7. Apparatus according to claim 2 in which the cavity tool is a split tool, the cavity tool parts being movable by the blank side panel shaping means toward one another as the tools move relatively to the closed condition.

8. Apparatus according to claim 7 in which the blank positioning means are displacable towards and away from the tool path as the split tool parts move towards and away from one another.

9. Apparatus according to claim 1 in which the blank positioning means comprise a projection on a stripper plate directed toward the cavity tool and engageable by a recess on the edge of a side panel remote from the end panel as the side panel reaches the folded condition, the core tool being movable relative to the stripper plate after the stripper plate has reached its final position relative to the cavity tool during the relative closing movement of the tools, thereby to move the recess in the side panel off the projection on the stripper plate and the stripper plate being movable relative to the cavity tool as the tools move towards the open condition to clear the path of a completed container from the apparatus.

10. Apparatus according to claim 1 in which the cavity tool is a split tool comprising a plurality of side parts movable towards and away from one another and towards and away from an end part which is received by inwardly projecting lips on the side parts in the closed condition of the cavity tool, the lips and end part together defining the closed end of the cavity tool and the lips forming stop means to position the junction of the end panel and each side panel before the split tool reaches the closed condition.

11. Apparatus according to claim 1 in which stop means are provided which lie adjacent the core tool and define a limit position for that edge of a side panel remote from the end panel in a direction extending away from the end panel when it is located against the end of the core tool directed toward the cavity tool.

12. Apparatus according to claim 1 in which the cavity tool is a split tool and a core tool is movable relative to the cavity tool toward the closed condition after the cavity tool has achieved its closed condition, whereby the splits of the split tool are closed before the blank and the core reach their final position in the cavity tool.

13. Apparatus according to claim 1 in which the cavity tool is partly a solid cavity tool and partly a split tool, the solid cavity tool forming the closed end of the cavity tool, the core tool including a mushroom at the free end thereof which projects from that end during relative closing movement of the tools and which will telescope into the core tool after engaging the end panel of a blank against the closed end of the cavity tool as the core tool moves to its closed condition.

* * * * *